(12) United States Patent
Ito

(10) Patent No.: US 9,083,721 B2
(45) Date of Patent: Jul. 14, 2015

(54) INFORMATION PROCESSING SYSTEM, CLIENT DEVICE, AND CONTROL METHOD

(71) Applicant: CANON KABUSHIKI KAISHA, Tokyo (JP)

(72) Inventor: Yuki Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 13/919,737

(22) Filed: Jun. 17, 2013

(65) Prior Publication Data

US 2014/0025832 A1 Jan. 23, 2014

(30) Foreign Application Priority Data

Jul. 19, 2012 (JP) .................................. 2012-160992

(51) Int. Cl.
*G06F 15/16* (2006.01)
*H04L 29/06* (2006.01)
*H04L 29/08* (2006.01)

(52) U.S. Cl.
CPC .......... *H04L 65/1069* (2013.01); *H04L 63/029* (2013.01); *H04L 67/02* (2013.01); *H04L 67/145* (2013.01)

(58) Field of Classification Search
USPC ................................... 709/227, 228; 370/351
See application file for complete search history.

(56) References Cited

U.S. PATENT DOCUMENTS

| | | | | |
|---|---|---|---|---|
| 6,557,037 | B1* | 4/2003 | Provino | 709/227 |
| 6,781,979 | B1* | 8/2004 | Ebata et al. | 370/338 |
| 7,158,525 | B2* | 1/2007 | Daffner et al. | 370/401 |
| 7,203,674 | B2* | 4/2007 | Cohen | 1/1 |
| 8,055,777 | B2* | 11/2011 | Noda et al. | 709/227 |
| 8,166,534 | B2* | 4/2012 | Yariv et al. | 726/11 |
| 2008/0194371 | A1* | 8/2008 | Matsubara et al. | 475/150 |
| 2010/0144339 | A1* | 6/2010 | Hasegawa et al. | 455/424 |
| 2010/0207820 | A1* | 8/2010 | Kawano et al. | 342/393 |
| 2012/0162708 | A1 | 6/2012 | Hagiwara | |
| 2012/0247542 | A1* | 10/2012 | Ammer et al. | 136/252 |
| 2012/0314250 | A1 | 12/2012 | Ito | |
| 2013/0043239 | A1* | 2/2013 | Falcon et al. | 219/620 |
| 2013/0229680 | A1* | 9/2013 | Kitada et al. | 358/1.15 |

FOREIGN PATENT DOCUMENTS

JP 2008-140275 6/2008

* cited by examiner

*Primary Examiner* — Tesfay Yohannes
(74) *Attorney, Agent, or Firm* — Fitzpatrick, Cella, Harper & Scinto

(57) ABSTRACT

An image forming apparatus establishes a first network connection using a network protocol to enable transmitting of a request that is issued by taking the server apparatus for the starting point through a firewall to the image forming apparatus. The client server apparatus transmits an instruction through the first network connection to establish a second network connection corresponding to an application installed on the image forming apparatus after establishment of the first network connection. The image forming apparatus establishes the second network connection in response to the instruction transmitted from the print server.

11 Claims, 13 Drawing Sheets

FIG. 6
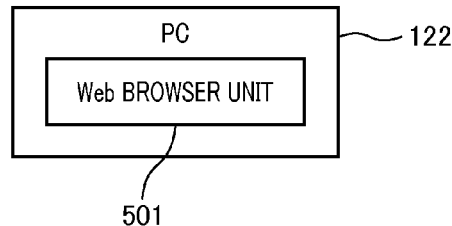
FIG. 7
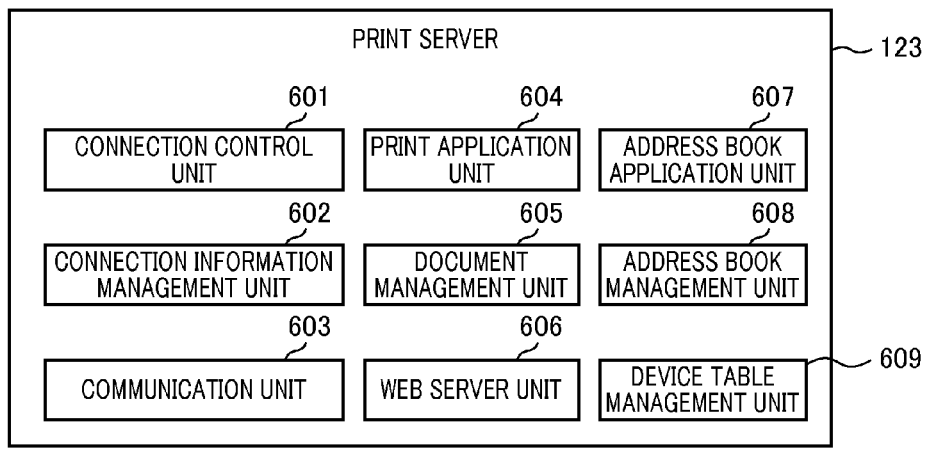
FIG. 8
| Application name | Path | Port number | Protocol name |
|---|---|---|---|
| Print | http://xxx.co.jp/print | 7681 | print |
| Address | http://xxx.co.jp/address | 7682 | address |

FIG. 12A

```
GET /print HTTP/1.1
Host: server.example.com
Upgrade: websocket
Connection: Upgrade
Sec-WebSocket-Key: dGhlIHNhbXBsZSBub25jZQ==
Origin: http://example.com
Sec-WebSocket-Protocol: print
Sec-WebSocket-Version: 13
```

FIG. 12B

```
HTTP/1.1 101 Switching Protocols
Upgrade: websocket
Connection: Upgrade
Sec-WebSocket-Accept: s3pPLMBiTxaQ9kYGzzhZRbK+xOo=
Sec-WebSocket-Protocol: print
```

FIG. 12C

```
<WebSocketControl>
  <AppName>print</AppName>
  <Status>open</Status>
</WebSocketControl>
```

FIG. 12D

```
<PrintJobRequest>
  <Job>
    <User>user1</User>
    <JobName>aaa.doc</JobName>
  </Job>
</PrintJobRequest>
```

Print job

FIG. 16A

```
GET /print HTTP/1.1
Host: server.example.com
Upgrade: websocket
Connection: Upgrade
Sec-WebSocket-Key: dGhlIHNhbXBsZSBub25jZQ==
Origin: http://example.com
Sec-WebSocket-Protocol: address
Sec-WebSocket-Version: 13
```

FIG. 16B

```
HTTP/1.1 101 Switching Protocols
Upgrade: websocket
Connection: Upgrade
Sec-WebSocket-Accept: s3pPLMBiTxaQ9kYGzzhZRbK+xOo=
Sec-WebSocket-Protocol: address
```

FIG. 16C

```
<WebSocketControl>
  <AppName>address</AppName>
  <Status>open</Status>
</WebSocketControl>
```

FIG. 16D

```
<AddressBook>
  <email>
    <User1>xxx@xxx.co.jp</User1>
    <User2>yyy@yyy.co.jp</User2>
  </email>
</AddressBook>
```

INFORMATION PROCESSING SYSTEM, CLIENT DEVICE, AND CONTROL METHOD

BACKGROUND OF THE INVENTION

1. Field of the Invention

The present disclosure relates to an information processing system, a client device and a method of control.

2. Description of the Related Art

A system has been proposed that enables use of various services on the Internet from a terminal of an intranet provided in a corporate environment. This system generally includes installation of a firewall on the internet/intranet boundary. The firewall allows connection from the intranet to the Internet, but is configured to refuse connection from the Internet to the intranet. In this manner, access from a terminal on the Internet into the intranet is limited. The above configuration is also premised on the fact that a conventional communication system using the WEB generally includes performance of an information acquisition request from a client to a server by PULL-type communication in which the server responds by transmitting the information.

However, in recent years, technical developments in PUSH-type communication have increased in which information is sent from the server to the client. An example of a PUSH-type communication technology is Comet or WebSocket. If an HTTP request is sent by a client to a server in Comet, the server retains the request without immediately responding. Thereafter, when information is produced to be sent from the server to the client, the information is sent as a response to the retained request.

WebSocket is a technology for bidirectional communication prepared by W3C or IETF which is the standardization body for the Internet. Establishment and maintenance of a TCP connection, rather than an HTTP connection, does not require mapping onto a HTTP protocol such as when using Comet, and thereby enables communication at a free timing from either the client or the server.

In this manner, in the context of a PUSH-type communication technology, information can be sent by use of a server connection even in an environment provided with a firewall by establishing and maintaining a connection from a client in an intranet.

Consequently, in recent years, a printing system has been proposed that uses PUSH-type communication. A PUSH-type printing system establishes a connection of a client device (printer) in an intranet with a server apparatus (print server) and constantly maintains that connection. In this manner, the print server can issue a request (print job execution request) when the print server is the starting point, and communicate that request at an arbitrary timing through a firewall to a printer. Japanese Patent Application Laid-Open No. 2008-140275 discloses a communication system configured so that an external host in an external network can transmit communication path maintenance data to an internal host with which access by the external host is restricted by a firewall for the maintenance of a communication path to the internal host.

For the promotion of continuous system development, a PUSH-type communication system using WebSocket has added a WebSocket connection in response to the addition of an application. That is to say, rather than for each printer, a WebSocket connection is required for each application that is installed on a printer.

When a WebSocket connection is provided for each application, the processing load for management of a constant connection for the number of applications by the print server is increased as the number of applications increases. Consequently, print server operations may become unstable or suitable processing operations may no longer be enabled. Furthermore, in a PUSH-type communication system using WebSocket, when a printer is started up, the printer must extend the WebSocket connections corresponding to the number of preinstalled applications. Therefore, the WebSocket connections that correspond to the applications that are not used for execution of a request issued by the print server are consequently an unnecessary resource.

SUMMARY OF THE INVENTION

The information processing system according to the present disclosure extends the connections corresponding to the number of applications used to execute a request, when establishing a network connection that enables transmitting of a request issued by taking a server apparatus for the starting point through a firewall to a client device.

The information processing system according to a first embodiment of the present disclosure is a system in which a client device and a server apparatus communicate through a firewall. The client device includes an establishment unit configured to establish a network connection using a network protocol to enable transmitting of a request that is issued by taking the server apparatus for the starting point, the server apparatus being disposed outside the firewall, through the firewall to the client device. The server apparatus includes a transmitting unit configured to transmit an instruction to establish a network connection corresponding to an application installed on the client device. Furthermore, after the first network connection is established by the establishment unit, the client device receives the instruction sent from the server apparatus through the first network connection, and the establishment unit establishes a second network connection in accordance with the received instruction.

Further features of the present invention will become apparent from the following description of embodiments with reference to the attached drawings.

BRIEF DESCRIPTION OF THE DRAWINGS

FIG. 6 illustrates a functional block diagram of a PC.

FIG. 7 illustrates a functional block diagram of a print server.

FIG. 8 illustrates an example of a connection information management table.

FIG. 12A to FIG. 12D illustrate an example of a message(s) that is/are sent and received between the image forming apparatus and the print server.

FIG. 16A to FIG. 16D illustrate an example of a message(s) that is/are sent and received between the image forming apparatus and the print server.

DESCRIPTION OF THE EMBODIMENTS

First Embodiment

Figure 1:
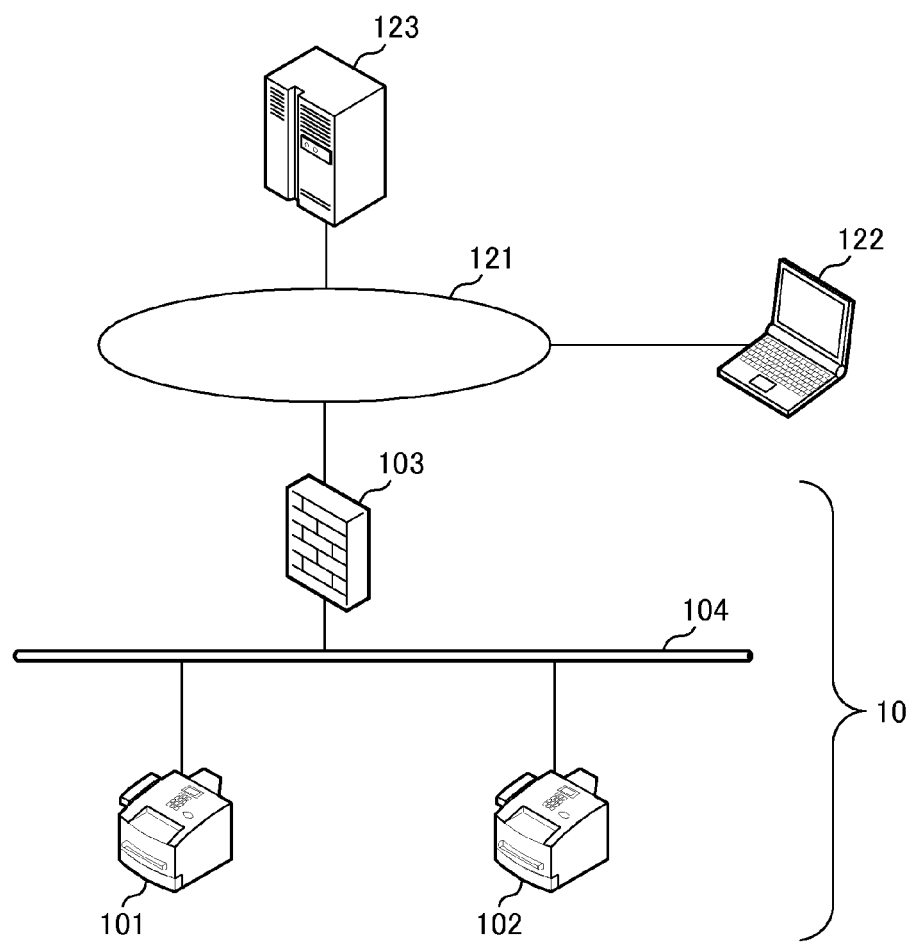
FIG. 1 illustrates a system configuration example of a first embodiment.

FIG. 1 illustrates a system configuration example of a first embodiment. The information processing system in the present embodiment is configured as a communication system that includes a print server 123, a personal computer (PC) 122, and image forming apparatuses 101, 102. The control method according to the present embodiment is realized by the functions of each apparatus included in the communication system illustrated in FIG. 1.

An intranet 10, the PC 122 and the print server 123 are connected with each other through a network (Internet 121 in FIG. 1). In FIG. 1, although only a single intranet 10 is illustrated, a plurality of intranets having the same configuration as the intranet 10 may be provided.

The intranet 10 is connected with the image forming apparatuses 101, 102 through the network 104, and a firewall 103 is provided at the boundary with the Internet 121. The print server 123 is disposed outside the firewall 103. In the present embodiment, the image forming apparatuses 101, 102 and the print server 123 communicate through the firewall 103. The number of image forming apparatuses provided in the communication system is not limited to two, and the communication system may include an arbitrary number of image forming apparatuses.

The image forming apparatuses 101, 102 function as a client device. More specifically, the image forming apparatuses 101, 102 include a function to print upon receipt of a print job from the print server 123 that is the server apparatus. Furthermore, the image forming apparatus 101 includes the function to transmit its address book to the print server 123, and the function to receive and update the address book from the print server 123. The image forming apparatus 101 and the image forming apparatus 102 have the same configuration. In the following description, the reference numeral 101 will be used as representative of the image forming apparatuses.

The PC 122 is an information processing apparatus that instructs printing to a preferred image forming apparatus by a user. The print server 123 controls the overall communication system, and performs various processes such as print request processing from the PC 122, print job managing, and transmitting of the address book to the image forming apparatus 101.

Figure 2:
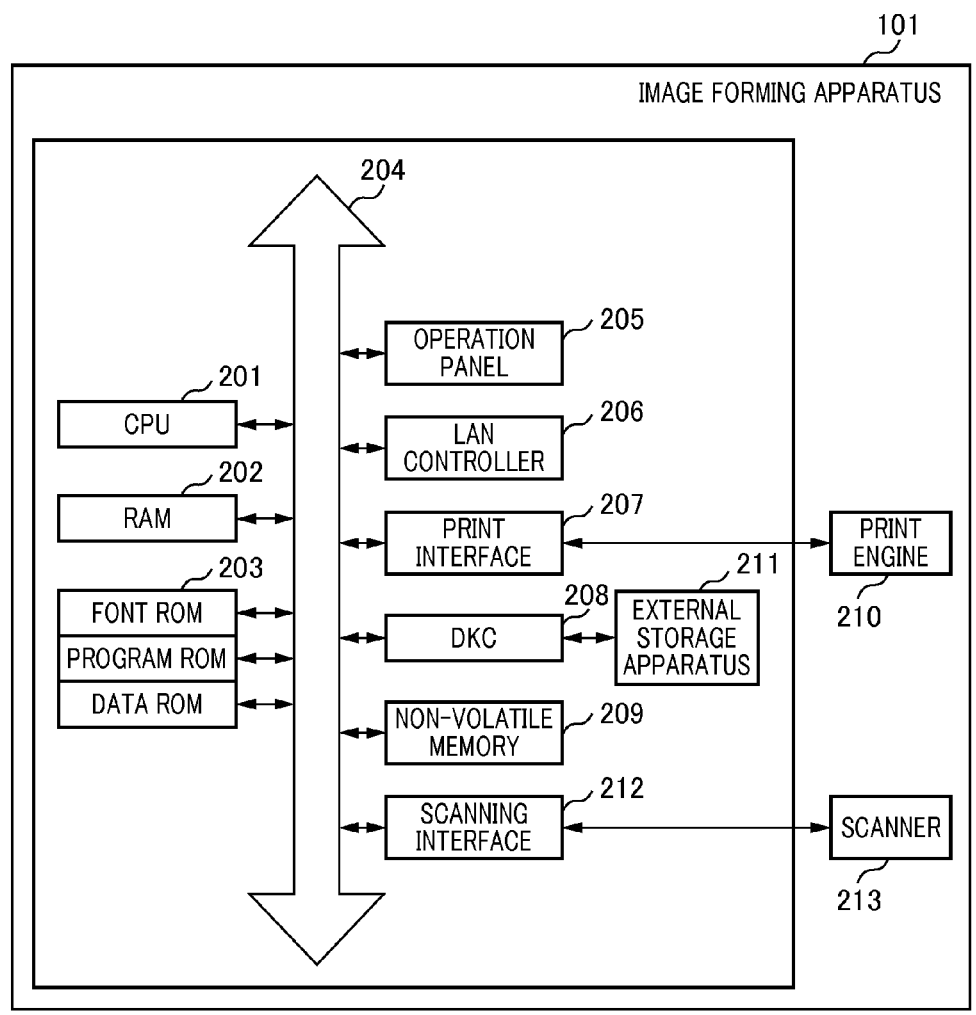
FIG. 2 illustrates a hardware configuration example of an image forming apparatus.

FIG. 2 illustrates a hardware configuration example of an image forming apparatus. In FIG. 2, the image forming apparatus 101 will be described with reference to an example of a configuration as a copying machine. The image forming apparatus 101 includes a CPU 201, a RAM 202, a ROM 203, an operation panel 205, a LAN controller 206, a print interface 207, a DKC 208, and a non-volatile memory 209. CPU is an abbreviation for central processing unit. RAM 202 is an abbreviation for random access memory. ROM is an abbreviation for read only memory. LAN is an abbreviation for local area network. DKC is an abbreviation for disk controller. The image forming apparatus 101 further includes a print engine 210, an external storage apparatus 211, a scanning interface 212, and a scanner 213.

The CPU 201 performs overall control of the access to various devices connected to a system bus 204 based on a control protocol stored in the program ROM in the ROM 203 or the external storage apparatus 211. The CPU 201 outputs an image signal as output information to the print unit (printer engine) 210 connected through the print interface 207. The CPU 201 controls the image signal input from the scanning unit (scanner) 213 that is connected through the scanning interface 212. The CPU 201 executes communication processing with the PC or the image forming apparatus on the network through the LAN controller 206.

The program ROM provided in the ROM 203 pre-stores a control program or the like for execution by the CPU 201. A font ROM provided in the ROM 203 pre-stores font data for use when generating output information described above (including outline font data). The data ROM provided in the ROM 203 pre-stores information or the like for use on the PC 122.

The RAM 201 functions mainly as the principal memory and work area for the CPU 201, and is configured to enable extension of the memory capacity by an option RAM connected to an expansion port (not illustrated). The RAM 202 is used in an output information rasterization area, an environment data storage area, or the like. The external storage apparatus 211 for example is a hard disk (HDD), an IC card, or the like. Access to the external storage apparatus 211 is controlled by a disk controller (DKC) 208.

The hard disk stores an application program, font data, form data, or the like, is used as a job storing area to temporary spool print jobs and control the spooled jobs from an external unit. Furthermore, the hard disk is also used as a BOX data storage area to retain image data scanned by the scanner 213 or image data for a print job as BOX data, to be referred from a network, and execute printing. In the present embodiment, an HDD is used as the external storage apparatus 211 to retain various types of logs such as a job log, an image log, or the like. The image forming apparatus 101 included not limited to a single external storage apparatus 211, and at least one or more external storage apparatus. The external storage apparatus 211 may be configured to enable connection of a plurality of external memories that store the option font card, a program or programs to interpret the printer control language that differs depending on the language system, in addition to the internally-stored fonts.

The operation panel 205 inputs information in response to a user operation. The user can input various types of information from a software key on the operation panel. The non-volatile memory 209 stores various types of setting information that is set from the operation panel 205.

Although not illustrated, the image forming apparatus 101 further enables optional attachment of various extension apparatuses such as two-sided apparatuses or the like configured to realize a two-sided printing function, a finisher configured to perform a stapling or a sorting function, or the like. The related operations are controlled from the CPU 201.

Figure 3:
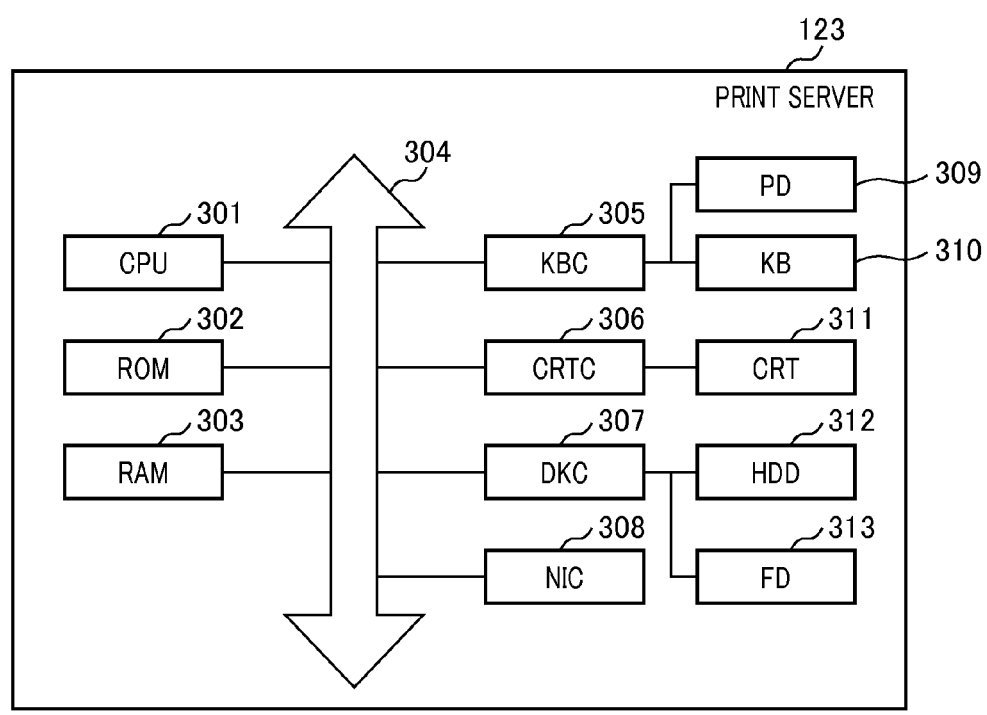
FIG. 3 illustrates a hardware configuration example of a computer realizing a PC and a printer server.

FIG. 3 illustrates a hardware configuration example of a computer realizing a PC and a printer server. The computer illustrated in FIG. 3 includes a CPU 301, a ROM 302, a RAM 303, a KBC 305, a CRTC 306, a DKC 307, and a NIC 308. KBC is an abbreviation for keyboard controller. CRTC is an abbreviation for cathode ray tube controller. NIC is an abbreviation for network interface card.

The computer illustrated in FIG. 3 includes a PD 309, a KB 310, a CRT 311, a HDD 312, and a FD 313. PD is an abbreviation for pointing device. KB is an abbreviation for keyboard. CRT is an abbreviation for cathode ray tube. HDD is an abbreviation for hard disk drive. FD is an abbreviation for Floppy (Registered Trademark) disk.

The CPU 301 controls the respective devices connected to a system bus 304. The ROM 302 pre-stores the BIOS or boot program. The RAM 303 is used as a main storage apparatus for the CPU 301. The KBC 305 inputs information from the PD 309 such as a Mouse (Registered Trademark), the KB 310, or the like. An internal portion of the CRT 306 includes a video memory, draws on the video memory in accordance with instructions from the CPU 301, and outputs the image data drawn on the video memory as a video signal to the CRT 311. The CRT is a display apparatus. The present embodiment can apply an arbitrary type of display apparatus, such as a liquid crystal display apparatus or the like.

The DKC 307 accesses the HDD 312 or the FD 313. The NIC 308 performs connection to the network and information communication through the network. The HDD 312 stores the OS or various types of application programs or the like that are operated on the OS. When the power source of the computer illustrated in FIG. 3 is in the ON position, the CPU 301 reads the OS from the HDD 312 onto the RAM 303 in accordance with the boot program stored in the ROM 302 and functions as an information processing apparatus.

In the present embodiment, the image forming apparatus 101 and the print server 123 communicate upon establishment of a network connection using WebSocket. WebSocket is one of the communication standards for bidirectional communication, and is a network protocol configured to continuously maintain a connection. WebSocket is one of the basic specifications for HTML5 as designated by W3C. W3C is an abbreviation for the World Wide Web Consortium. HTML5 is an abbreviation for hyper text markup language 5. WebSocket enables establishment of a continuous connection between a client and a server, to thereby initiate transmitting of data at any time from either side through the resulting connection. That is to say, in contrast to a conventional server client system, the server apparatus not only executes passive processing by transmitting data after receipt of a request from the client device, but also executes active processing by transmitting of data in the absence of a request. WebSocket corresponds to data transmission to the client device in which the server apparatus is as starting point. In the following description, the network connection due to WebSocket will be termed a WebSocket connection.

Figure 4:
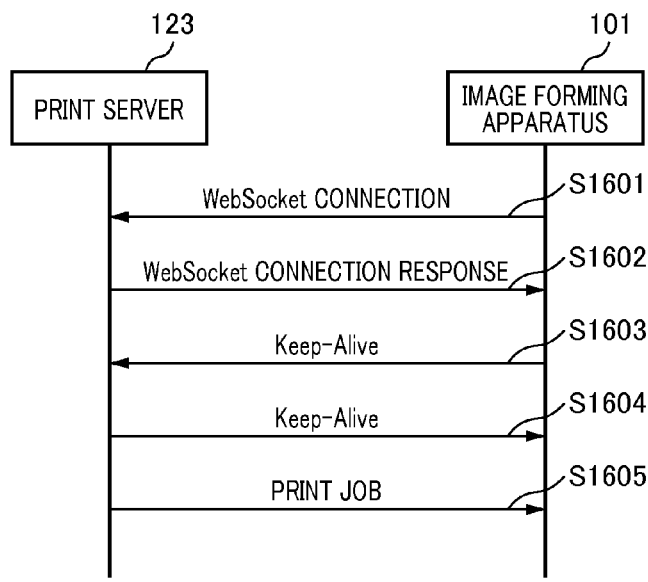
FIG. 4 illustrates an example of the basic WebSocket sequence.

FIG. 4 illustrates an example of the basic WebSocket sequence. In S1601 in FIG. 4, the image forming apparatus 101 transmits a WebSocket connection message as illustrated in FIG. 12A. In S1602, the print server 123 returns the WebSocket connection response message as illustrated in FIG. 12B. In S1603, S1604, the image forming apparatus 101 and the print server 123 maintain the WebSocket connection by transmitting and receiving periodical keep-alive signals of the TCP. The connection may be maintained by transmitting and receiving periodical packet s, and therefore by transmitting and receiving periodical Ping-Pong signals. In S1605, the print server 123 uses the WebSocket connection to transmit the print job as illustrated in FIG. 12D to the image forming apparatus 101. Even when a firewall is provided between the image forming apparatus 101 and the print server 123, the WebSocket connection may be used to enable transmitting of a PUSH signal from outside the firewall.

Figure 5:
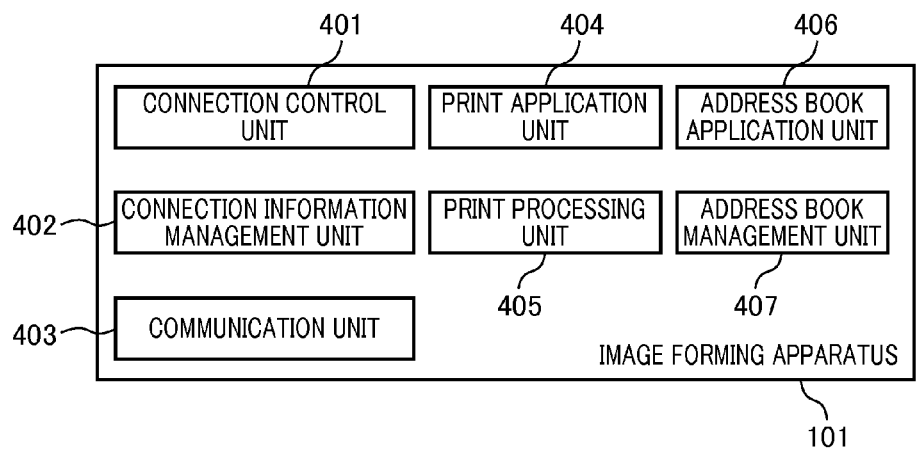
FIG. 5 illustrates a functional block diagram of an image forming apparatus.

FIG. 5 illustrates a functional block diagram of an image forming apparatus. The image forming apparatus 101 includes a connection control unit 401, a connection information management unit 402, a communication unit 403, a print application unit 404, a print processinging unit 405, an address book application unit 406, and an address book management unit 407.

The connection control unit 401 controls connection and disconnection of the WebSocket upon receipt of an instruction from the communication unit 403, the print application unit 404, and the address book application unit 406. That is to say, the connection control unit 401 establishes a network connection by use of a network protocol that enables transmitting of a request that is issued by taking the print server 123 for the starting point through the firewall 103 to the image forming apparatus 101. In the present embodiment, the connection control unit 401 establishes the first network connection by connecting a control WebSocket when the image forming apparatus 101 is started up. The control WebSocket is a network protocol (first network protocol) configured to control the connection/disconnection of an application WebSocket. The application WebSocket is a network protocol (second network protocol) corresponding to the respective applications that are installed on the image forming apparatus 101. The application WebSocket is used for communication of information (for example, application data for print jobs or the like) required for execution of processing in response to a request issued by the print server 123, and is provided between the print server 123 and the application.

After the first network connection is established, the connection control unit 401 receives an application startup notification that is transmitted from the print server 123 through the first network connection. The application startup notification is a notification that instructs startup of the application that is installed in the image forming apparatus 101. In the present embodiment, the application startup notification functions as an instruction for establishment of the network connection by the application WebSocket corresponding to the above application. The connection control unit 401 executes the following processing in response to the application startup notification. The connection control unit 401 connects the application WebSocket corresponding to the application, of the applications that are installed in the image forming apparatus, that will execute the processing corresponding to the request that is issued by taking the print server 123 for the starting point, and in this manner, establishes the second network connection.

The connection information management unit 402 manages the connection information 1301. The communication unit 403 receives the transmit instruction from the connection control unit 401 and transmits the packet. The communication unit 403 receives the packet from the external apparatus and transfers the packet to the connection control unit 401. The print application unit 404 functions as an application (print app) that receives the print job from the print server 123, and transfers the job to the print processing unit 405. The print processing unit 405 analyzes the print job and rasterizes the job to a bit map for printing onto a sheet of paper. The address book application unit 406 functions as an address book application (address book app) configured to transmit and receive the address book and instruct the address book management unit 407. The address book is a list of the contacts on the network. The address book for example includes a network address of the transmitting address associated with a high transmitting frequency such as data or instructions, or the like. The address book management unit 407 receives an instruction from the address book application unit 406 and updates and stores the address book.

FIG. 6 illustrates a functional block diagram of a PC. The PC 122 includes a web browser unit 501. The web browser unit 501 acquires operation screen information from the print server 123, displays an operation screen, and executes designation of the image forming apparatus or printing instructions in response to the user operation on the operation screen.

FIG. 7 illustrates a functional block diagram of a print server. The print server 123 includes a connection control unit 601, a connection information management unit 602, a communication unit 603, a print application unit 604, a document management unit 605, a web server unit 606, an address book application unit 607, an address book management unit 608, and a device table management unit 609.

The connection control unit 601 receives an instruction from the communication unit 603, the print application unit 604, and the address book application unit 607, and transmits an application startup notification or application stop notification through the control WebSocket. The transmission via WebSocket means transmission of data as payload data by use of the current WebSocket connection.

The application stop notification is an instruction to the image forming apparatus 101 to suspend connection of the application WebSocket. In the present embodiment, when the print job execution issued to the image forming apparatus 101 by the print server 123 is completed, the connection control unit 601 transmits the application stop notification to the image forming apparatus 101.

The connection information management unit 402 retains the connection information management table, and manages the connection information set in the connection information management table.

FIG. 8 illustrates an example of a connection information management table. The connection information management table 1301 includes data items such as an application name 1302, a path 1303, a port number 1304, and a protocol name 1305. The application name 1302 is the same that identifies the application. The path 1303 is the path used when connecting the application WebSocket to the print server 123. The port number 1304 is the port number used when connecting the application WebSocket to the print server 123. The protocol name 1305 is used as a Sec-WebSocket-Protocol header and indicates the relevant application WebSocket.

Returning now to FIG. 7, the communication unit 603 transmits the packet upon receipt of a transmit instruction from the connection control unit 601. The communication unit 603 receives the packet from the external apparatus and transfers the packet to the connection control unit 401. The web server unit 606 provides the UI to the PC 122, returns the document information that is managed by the document management unit 605, and receives a print instruction from the user. When the web server unit 606 receives the print instruction, the print application unit 604 functions as a print application (print app) that generates a print job appropriate for the image forming apparatus that is designated by the print instruction, and that transmits the job through the application WebSocket. The application WebSocket is used in transmitting and receiving information required for print processing by the print application unit 404 of the image forming apparatus 101 and the print application unit 604. That is to say, when the print application unit 604 receives a specific request from the PC 122, that is the external apparatus, the print application unit 604 functions as an issuing unit configured to execute the following processing operations. The print application unit 604 issues an execution request by taking the print server 123 for the starting point, and transmits the issued execution request for the print job through the application WebSocket corresponding to the print application unit 404 of the image forming apparatus 101 to the print application unit 404.

The address book application unit 607 functions as an address book application (address book app) configured to receive the address book from the image forming apparatus 101, and retain the address book in the address book management unit 608. The address book application unit 607 distributes the updated address book to the image forming apparatus 101 through the application WebSocket. The address book management unit 608 manages the address book that is distributed to the image forming apparatus 101. The device table management unit 609 manages the device table. The device table includes information related to the image forming apparatus 101 (device information). The device table is prepared in advance by management personnel.

Figure 9:
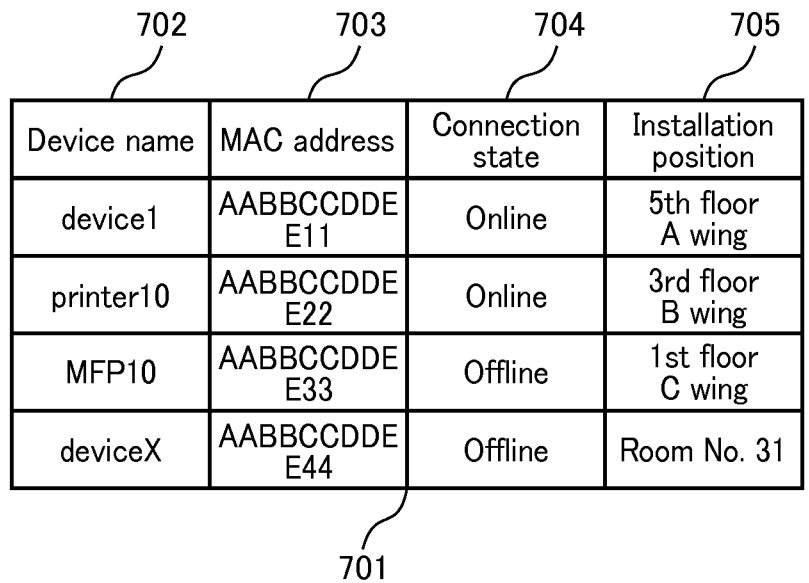
FIG. 9 illustrates an example of a device table.

FIG. 9 illustrates an example of a device table. The device table 701 includes data items such as the device name 702, the MAC address 703, the connection state 704, and the installation position 705. That is to say, the information set in relation to the device name 702 to the installation position 705 is the device information.

The device name 702 is the name that identifies the image forming apparatus. The MAC address 703 is the unique identifier retained by the NIC of the image forming apparatus. The connection state 704 indicates whether or not the image forming apparatus 101 is connected to the network. A setting of "Online" in the connection state 704 indicates a state in which the image forming apparatus 101 is connected to the network. Furthermore, a setting of "Offline" in the connection state 704 indicates a state in which the image forming apparatus 101 is not connected to the network. When the control WebSocket is connected, the device table management unit 609 determines that the image forming apparatus 101 is connected to the network, and performs a setting of "Online" in relation to the connection state. Furthermore, when the control WebSocket is disconnected, the device table management unit 609 determines that the image forming apparatus 101 is not connected to the network, and performs a setting of "Offline" in relation to the connection state. The installation position 705 is the installation position of the image forming apparatus 101. The information set to the installation position 705 is used as reference information when the user selects the image forming apparatus for performance of printing.

Figure 10:
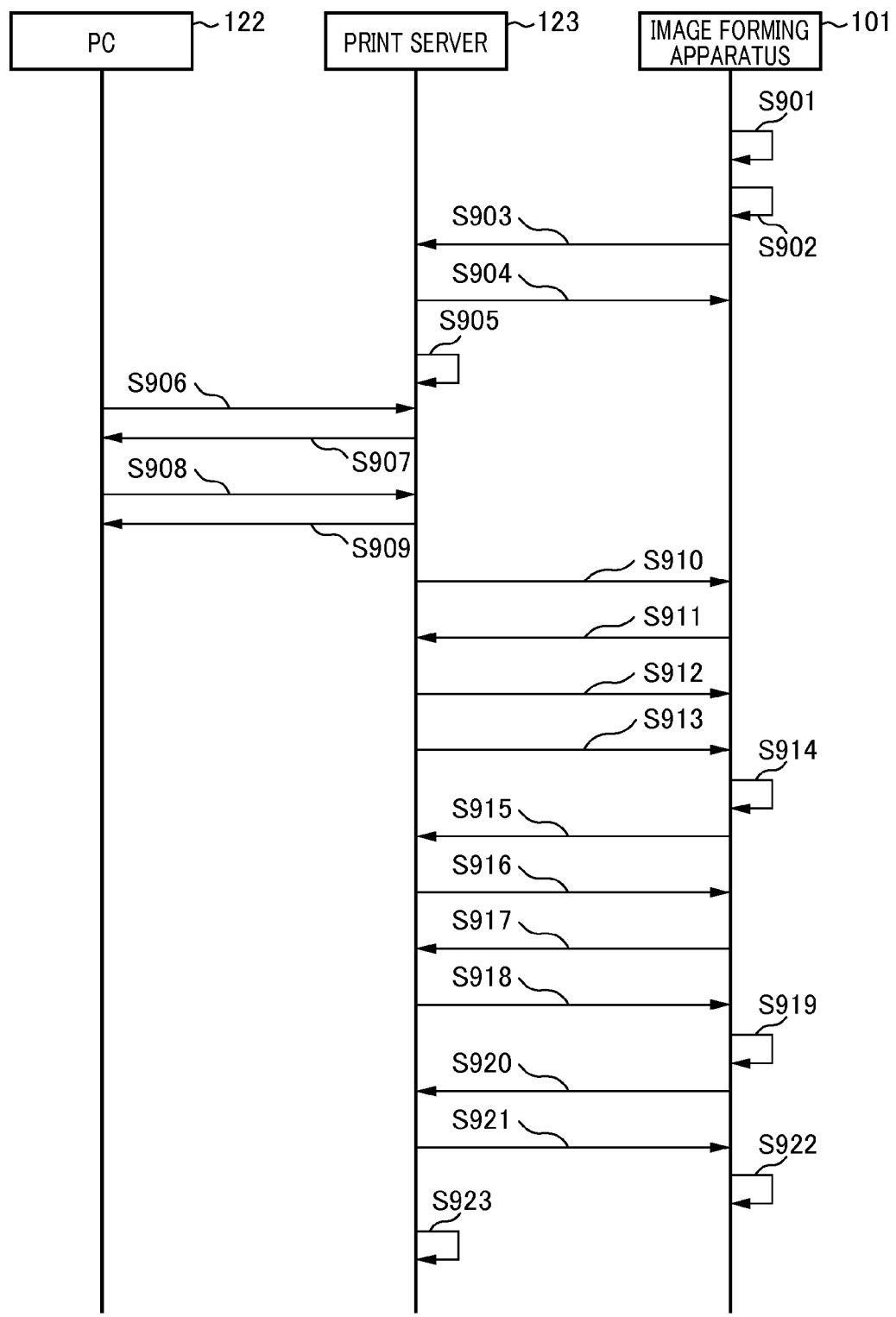
FIG. 10 illustrates a sequence figure that describes an example of a print processing in a communication system.

FIG. 10 illustrates a sequence figure that describes an example of a print processing in a communication system. The programs of the image forming apparatus 101 that realizes the print processing described with reference to FIG. 9 are stored in the HDD 211 of the image forming apparatus 101, and are read into the RAM 202 for execution by the CPU 201. The respective programs of the PC 122 and the print server 123 that execute the print processing above are stored in the HDD 312 of the respective devices and are read into the RAM 303 for execution by the CPU 301.

Firstly, the image forming apparatus 101 is started up in response to a user operation (S901). Then the image forming apparatus 101 records the application information (S902). The image forming apparatus 101 transmits a message as illustrated in FIG. 12A to the print server 123 to thereby perform the control WebSocket connection.

The print server 123 returns the control WebSocket connection response as the message illustrated in FIG. 12B to the image forming apparatus 101 (S904).

Then, the print server 123 updates the connection state (S905). More specifically, the device table management unit 609 sets the connection state 704 corresponding to the image forming apparatus 101 in the device table 701 as "Online".

Next, the PC 122 transmits a print screen acquisition request to the print server 123 in response to a user operation (S906). Then the print server 123 returns the print screen to the PC 122 (S907). The Web browser unit 501 provided in the PC displays the printer selection screen in response to the user operation on the print screen (not illustrated).

Figure 11:
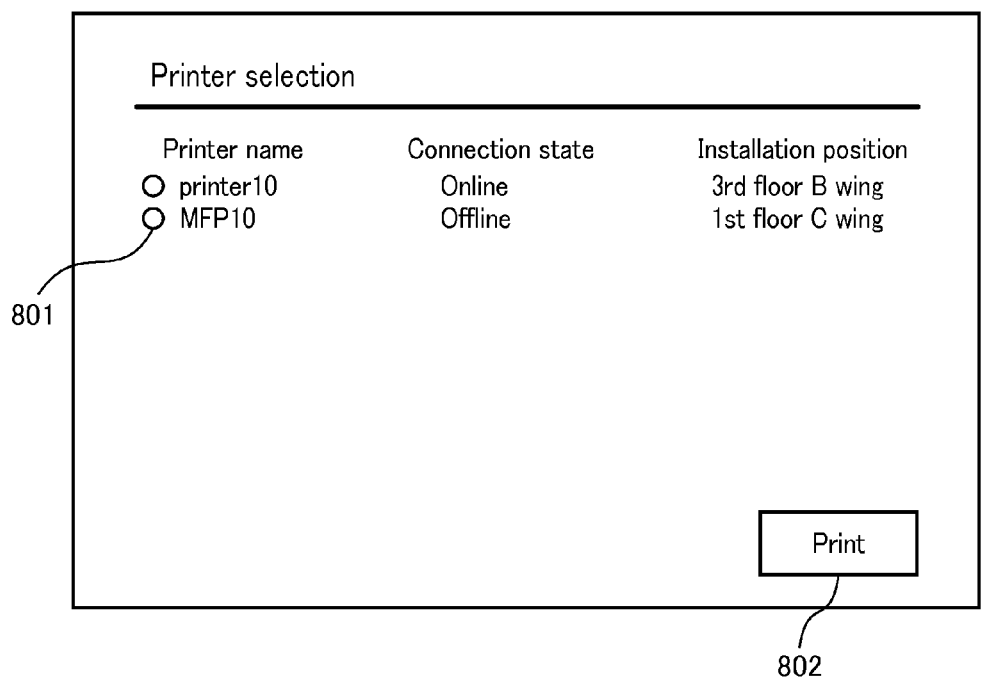
FIG. 11 illustrates an example of a printer selection screen.

FIG. 11 illustrates an example of a printer selection screen. The printer selection screen displays a list of printers that can be used by a user, and when the user checks the checkbox 801 of the desired printer and pushes the button 802, the printer for execution of printing is selected. When acquiring the print screen, the PC 122 acquires printer selection screen data from the print server 123, and displays the printer selection screen based on the printer selection screen data. The printer selection screen data is the screen data used in printer selection when instructing a print request. Thus, the Web server unit 606 provided in the print server 123 acquires device information from the device table 701 illustrated in FIG. 9 described above, generates printer selection screen data based on the device information, and provides the data to the PC 122.

When the user presses the print button 802 on the printer selection screen, the image forming apparatus 101 for print output is set. Then when the user designates the document to be printed on the print screen, the PC 122 transmits the print request to the print server 123 (S908).

The Web server unit 606 may transmit the printer selection screen data including, as display information, device information for the image forming apparatus that has an "Online" connection state in the device table 701, that is to say, that has been connected to the control WebSocket, to the PC 122. In this manner, the image forming apparatus connected to the control WebSocket is displayed on the printer selection screen of the PC 122.

Next, the print server 123 returns the response to the print request to the PC 122 (S909). Then, the print server 123 transmits the application startup notification illustrated in FIG. 12C to the image forming apparatus 101 as a Push transmission from outside the firewall through the control WebSocket (S910). That is to say, the connection control unit 601 provided in the print server 123 executes the following processing through the control WebSocket upon receipt of a print request from the PC 122. The connection control unit 601 transmits the startup notification for the application that will execute the print job to the image forming apparatus 101 as an instruction for establishing the second network connection corresponding to the application.

The print server 123 may transmit the application startup notification at any time between S905 to S909. However in order to reduce the connection time of the application WebSocket, a later transmitting timing is preferred. Therefore, in the example illustrated in FIG. 10, the print server 123 transmits the application startup notification after the print request response in S909.

Next, the image forming apparatus 101 executes an application WebSocket connection by transmitting the type of message illustrated in FIG. 12A to the print server 123 (S911). Then, the print server 123 returns the application WebSocket connection response using the type of message illustrated in FIG. 12B to the image forming apparatus 101 (S912). The print server 123 transmits the print job illustrated in FIG. 12D to the image forming apparatus 101 using a Push communication through the application WebSocket.

Next, the image forming apparatus 101 executes print processing (S914). Then, the image forming apparatus 101 transmits the job completion notification through the application WebSocket to the print server 123 (S915). The print server 123 transmits the application stop notification through the application WebSocket to the image forming apparatus 101 (S916). The print server 123 may transmit the application stop notification at any time from S915 to S920. However, in order to reduce the connection time of the application WebSocket, an earlier transmitting timing is preferred. Therefore, in the example illustrated in FIG. 10, the print server 123 takes the disconnection timing of the application WebSocket as the print job transmitting stop time by transmitting the application stop notification upon receipt of the job completion notification from the image forming apparatus 101.

Then, the image forming apparatus 101 transmits the application WebSocket disconnection to the print server 123 (S917). Subsequently, the print server 123 returns the application WebSocket disconnection response to the image forming apparatus 101 (S918). Thereafter, the image forming apparatus 101 detects a user shutdown instruction operation, and performs processing prior to execution of shutdown (S919).

Then, the image forming apparatus 101 transmits the control WebSocket disconnection to the print server 123 (S920). The print server 123 returns the control WebSocket disconnection response to the image forming apparatus 101 (S921). Then, the image forming apparatus 101 executes shutdown (S922). Since the control WebSocket connection of the image forming apparatus 101 is disconnected, the print server 123 updates the connection state (S923). More specifically, the device table management unit 609 sets the connection state 704 in the device table 701 corresponding to the image forming apparatus 101 to "Offline".

FIG. 12 illustrates an example of a message(s) that is/are transmitted and received between the image forming apparatus and the print server according to the first embodiment. FIG. 12A illustrates an example of a message that is transmitted for the WebSocket connection. In contrast to an HTTP header, a WebSocket header describes webSocket in the Upgrade header, and Upgrade in the Connection header. The Sec-WebSocket-Protocol header indicates the use that is made of WebSocket. In the present embodiment, "control" is described to indicate a control WebSocket and "print" is described to indicate a print application WebSocket. The message is transmitted in S903, S911 in FIG. 10, and in S1105, S1111 in FIG. 13. The print server 123 receiving the message returns a response message as illustrated in FIG. 12B.

FIG. 12B illustrates an example of a response message in relation to the message illustrated in FIG. 12A. Websocket is described in the Upgrade header, and Upgrade in the Connection header. The Sec-WebSocket-Protocol header indicates the use that is made of WebSocket. The message is transmitted in S904, S912 in FIG. 10, and in S1208, S1210 in FIG. 14, to thereby establish a WebSocket connection between the image forming apparatus 101 and the print server 123.

FIG. 12C illustrates an example of a message that instructs connection of the application WebSocket through the control WebSocket. The <WebSocketControl> tag indicates use in WebSocket control. The <AppName> tag indicates the application name, and the application WebSocket that is the subject of the instruction. The <Status> tag indicates whether the instruction is a connection instruction or a disconnection instruction. In the present embodiment, when the <Status> tag is open, a connection instruction is indicated, and when close, a disconnection instruction is indicated. The message is transmitted in S910 in FIG. 10, and in S1205 in FIG. 14. The image forming apparatus 101 receiving the message transmits the application WebSocket connection to the print server 123.

FIG. 12D illustrates an example of a message that transmits the print job through the application WebSocket. The <PrintJobRequest> tag indicates a print request. The <Job> tag indicates the information for the print job. The <User> tag indicates the user name executing the printing. The <Job- Name> tag indicates the document name. In the present embodiment, the print job data is attached after the <PrintJobRequest> tag. The message is transmitted in S913 in FIG. 10, and in S1206 in FIG. 14. The image forming apparatus 101 receiving the message executes the print processing.

Figure 13:
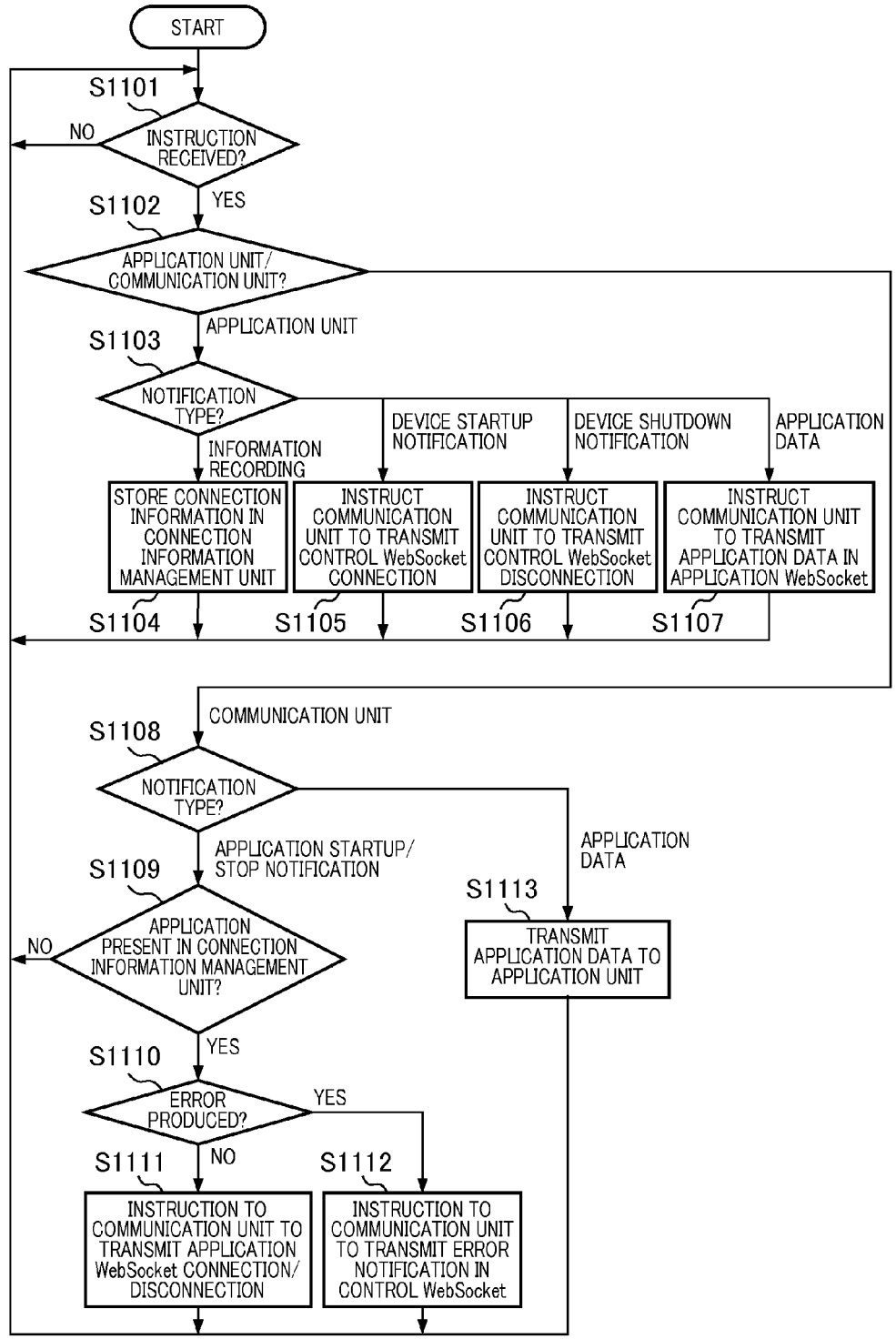
FIG. 13 illustrates a flowchart that describes an example of an operating processing of a connection control unit provided in the image forming apparatus.

FIG. 13 illustrates a flowchart that describes an example of an operating processing of a connection control unit provided in the image forming apparatus. The program that executes the processes according to the flow is stored in the HDD 211 of the image forming apparatus 101, and is read onto the RAM 202 for execution by the CPU 201.

The connection control unit 401 determines whether an instruction has been received (S1101). When the connection control unit 401 determines that the instruction has not been received, the processing returns to S1101. When the connection control unit 401 determines that the instruction has been received, the processing proceeds to S1102.

Next, the connection control unit 401 determines whether the instruction (notification) has been received from an application unit (print application unit 404, address book application unit 406), or the communication unit 403 (S1102). When the connection control unit 401 determines that the instruction has been received from an application unit, the processing proceeds to S1103.

In S1103, the connection control unit 401 determines the type of instruction. When the instruction is an information recording instruction, the processing proceeds to S1104. The connection control unit 401 stores the connection information in the connection information management unit 402 (S1104), and the processing returns to S1101. The connection information includes the application name, the path, the port number and the protocol name. When the instruction is a device startup notification indicating that the image forming apparatus 101 has started up, the processing proceeds to S1105. The connection control unit 401 uses the message illustrated in FIG. 12A to instruct the communication unit 403 to transmit the control WebSocket connection (S1105). The feature of transmitting the WebSocket connection uses the message illustrated in FIG. 12A to thereby transmit information required during the WebSocket connection. The communication unit 403 transmits an actual packet including the message illustrated in FIG. 12A.

When the instruction is a device shutdown notification indicating that the image forming apparatus 101 shuts down, the processing proceeds to S1106. Consequently, the connection control unit 401 instructs the communication unit 403 to transmit the control WebSocket disconnection (S1106).

When the instruction is application data, the processing proceeds to S1107. Consequently, the connection control unit 401 instructs the communication unit 403 to transmit the application data in the application WebSocket (S1107).

In the determination process in S1102, when the connection control unit 401 determines that a notification has been received from the communication unit 403, the processing proceeds to S1108. Then the connection control unit 401 determines the type of notification (S1108). When the connection control unit 401 determines that the notification is an application startup/stop notification, the processing proceeds to S1109. Then the connection control unit S401 reads the application information from the received notification information, and determines whether the application name is present in the connection information management table 1301 (FIG. 8) (S1109).

When the application name is not present in the connection information management table 1301, the processing returns to S1101. When the application name is present in the connection information management table 1301, the processing proceeds to S1110. Then, the connection control unit 401 determines whether an error such as a jam has occurred in the image forming apparatus 101 (S1110). When the connection control unit 401 determines that an error such as a jam has not occurred in the image forming apparatus 101, the processing proceeds to S1111. Then the connection control unit 401 instructs the communication unit 403 to transmit an application Websocket connection/disconnection (S1111). The connection control unit 401 uses the message illustrated in FIG. 12A to transmit the application WebSocket connection to the print server 123.

When the connection control unit 401 determines that an error such as a jam has occurred in the image forming apparatus 101, the processing proceeds to S1112. The connection control unit 401 instructs the communication unit 403 to perform an error notification using the control WebSocket (S1112). The connection control unit 401 may transmit the error notification through the application WebSocket after the connection of the application WebSocket. When the connection control unit 401 has transmitted the error notification, the application Websocket is disconnected.

In the determination process in S1108, when the connection control unit 401 determines that the received notification is application data, the processing proceeds to S1113. Then the connection control unit 401 determines the application WebSocket through which the application data has been received, and transmits the application data to the relevant application unit. For example, when the application data is a print job received through the print application WebSocket, the connection control unit 401 transmits the print job to the print application unit 404.

Figure 14:
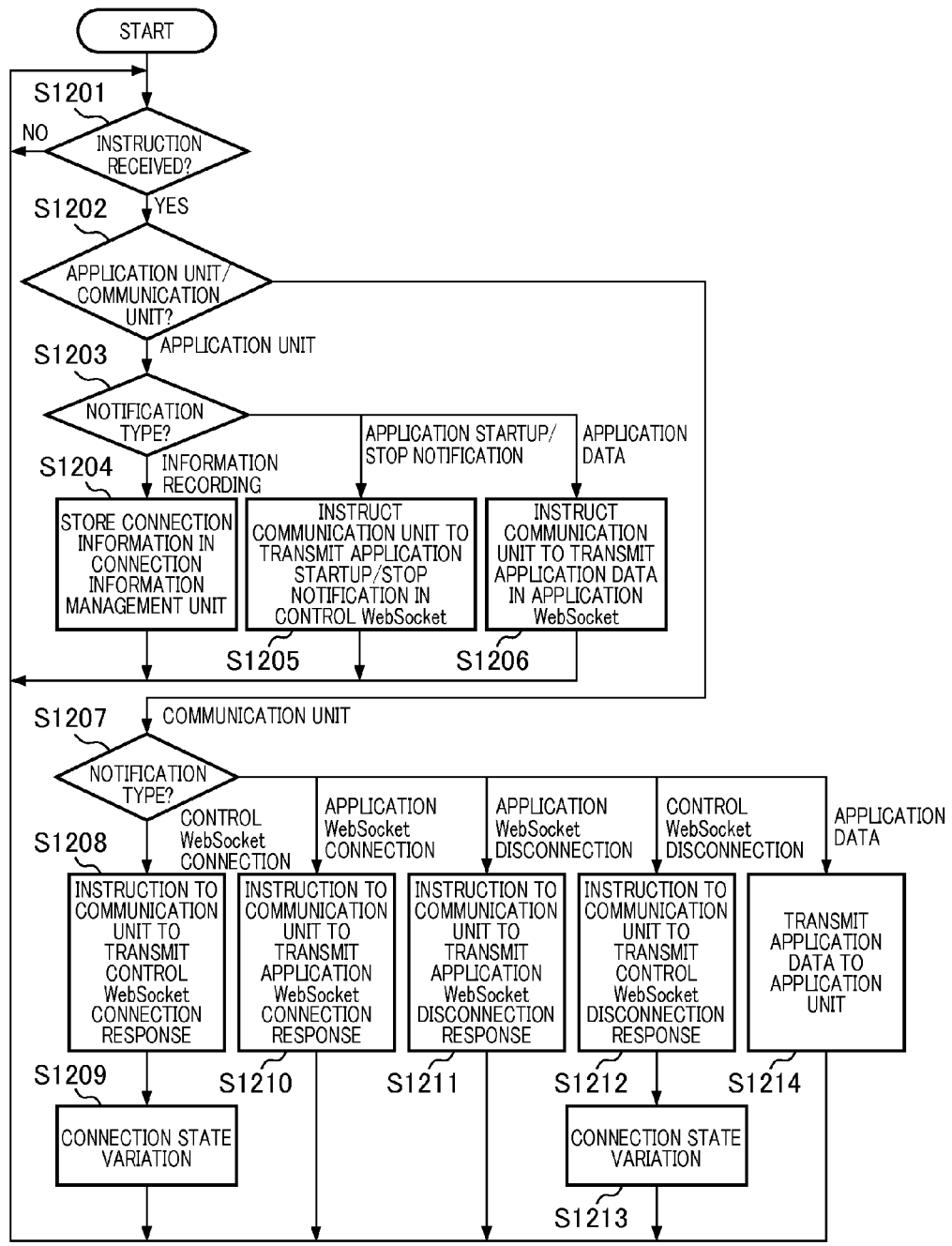
FIG. 14 illustrates a flowchart that describes an example of an operating processing of a connection control unit provided in the print server.

FIG. 14 illustrates a flowchart that describes an example of an operating processing of a connection control unit provided in the print server. The program that executes the processes according to the flow is stored in the HDD 312 of the print server 123, and is read onto the RAM 303 for execution by the CPU 301.

The connection control unit 601 determines whether an instruction has been received (S1201). When the connection control unit 601 determines that an instruction has not been received, the processing returns to S1201. When the connection control unit 601 determines that an instruction has been received, the processing proceeds to S1202.

Next, the connection control unit 601 determines whether the instruction (notification) has been received from an application unit (print application unit 604, address book application unit 606), or the communication unit 603 (S1202). When the connection control unit 601 determines that the instruction has been received from an application unit, the processing proceeds to S1203.

In S1203, the connection control unit 601 determines the type of instruction. When the instruction is an information recording instruction, the processing proceeds to S1204. The connection control unit 601 stores the connection information in the connection information management unit 602 (S1204), and the processing returns to S1201. The connection information includes the application name, the path, the port number and the protocol name.

When the instruction is a device startup notification indicating that the image forming apparatus 101 has started up, the processing proceeds to S1205. The connection control unit 601 uses the response message illustrated in FIG. 12B to instruct the communication unit 603 to transmit the control WebSocket connection (S1205). The feature of transmitting the WebSocket connection uses the response message illustrated in FIG. 12B to transmit information required during the WebSocket connection. The communication unit 403 transmits an actual packet including the message illustrated in FIG. 12A.

When the instruction is an application startup/stop notification, the processing proceeds to S1205. Consequently, the connection control unit 601 instructs the communication unit 603 to perform an application startup/stop notification using the control WebSocket (S1205). The connection control unit 601 transmits the application startup notification using a message as illustrated in FIG. 12C.

When the instruction is application data, the processing proceeds to S1206. Consequently, the connection control unit 601 instructs the communication unit 603 to transmit the application data by the application WebSocket (S1206). More specifically, the connection control unit 601 instructs the communication unit 603 to transmit the application data as illustrated in FIG. 12D using the application WebSocket.

In the determination process in S1202, when the connection control unit 601 determines that a notification has been received from the communication unit 603, the processing proceeds to S1207. Then the connection control unit 601 determines the type of notification (S1207).

When the connection control unit 601 determines that the notification is a control Websocket connection, the processing proceeds to S1208. Then the connection control unit 601 uses the message as illustrated in FIG. 12B for example to instruct the communication unit 603 to transmit the control WebSocket connection response (S1208). Thereafter, the connection control unit 601 updates the connection state (S1209), and the processing returns to S1201.

When the connection control unit 601 determines that the notification is an application Websocket connection, the processing proceeds to S1210. Then the connection control unit S601 uses the message as illustrated in FIG. 12B for example to instruct the communication unit 603 to transmit the application WebSocket connection response (S1210).

When the connection control unit 601 determines that the notification is an application Websocket disconnection, the processing proceeds to S1211. Then the connection control unit S601 instructs the communication unit 603 to transmit the application WebSocket disconnection response (S1211).

When the connection control unit 601 determines that the notification is a control Websocket disconnection, the processing proceeds to S1212. Then the connection control unit S601 instructs the communication unit 603 to transmit the control WebSocket disconnection response (S1212). Thereafter, the connection control unit 601 updates the connection state (S1213).

When the connection control unit 601 determines that the notification is application data, the processing proceeds to S1214. Then the connection control unit S601 transmits the application data to the application unit (S1214).

The communication system in the first embodiment enables the following effects by establishing a network connection that enables transmitting of a print request, that is issued by taking the print server 123 for the starting point, through a firewall to a client device. That is to say, the connection can be extended corresponding to the number of applications used in realizing the request. In other words, the communication system according to the first embodiment connects a single control WebSocket, and controls the connection and disconnection of the application WebSocket through the control WebSocket. Therefore, even when the number of applications in a printer is increased, the load on the print server 123 related to network connection management can be suppressed. Furthermore, the printer in the communication system according to the first embodiment does not require a connection of an application WebSocket in relation to all applications during startup, and therefore unnecessary printer resources can be prevented.

Second Embodiment

A communication system according to the second embodiment executes address book distribution by an address book application that applies a control WebSocket. The system configuration of the second embodiment is the same as the system configuration illustrated in FIG. 1. In the present embodiment, the description of those features that are the same as those in the first embodiment will be omitted, and only differences will be described.

Figure 15:
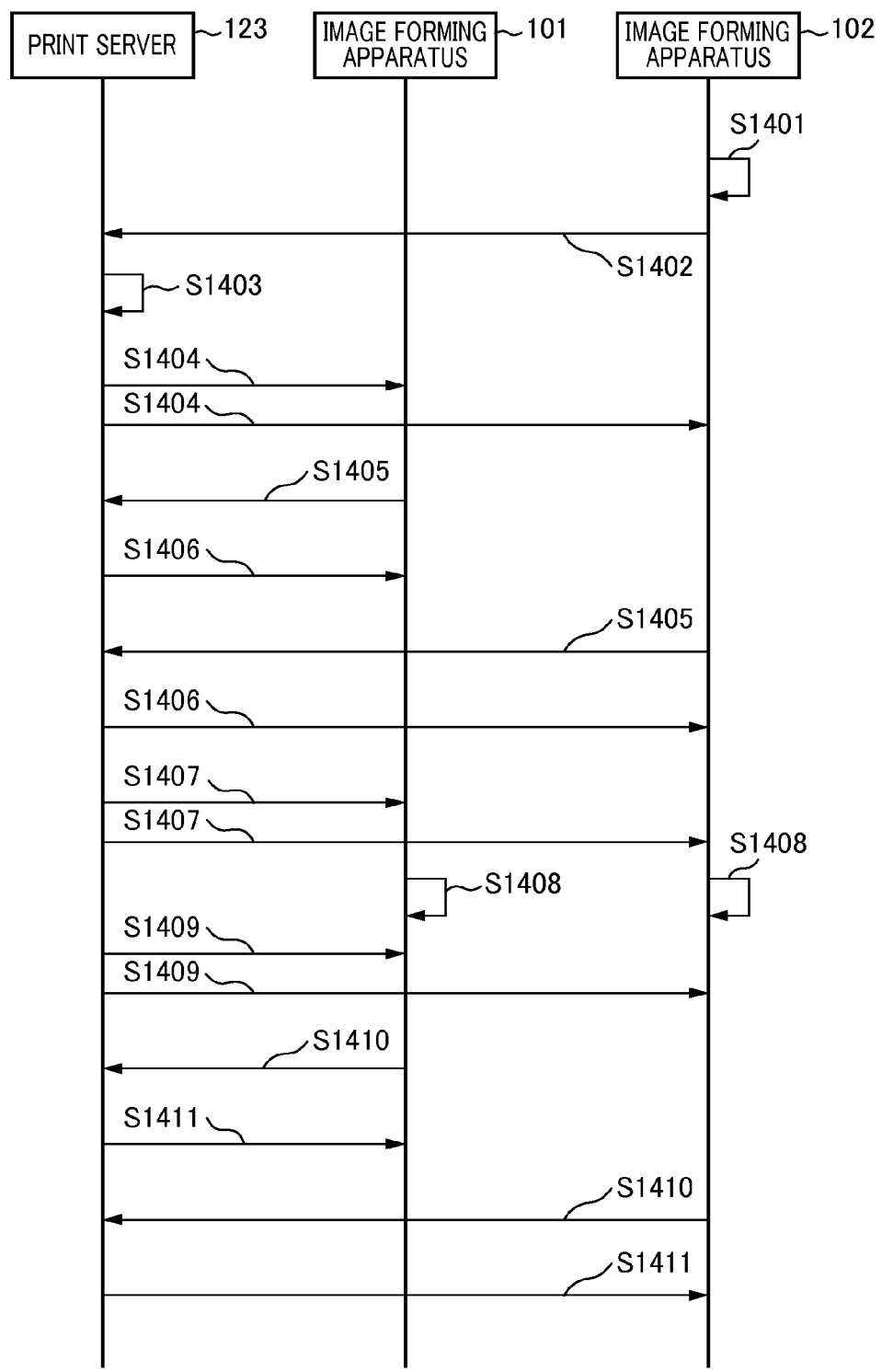
FIG. 15 illustrates a sequence figure that describes an example of an address book distribution processing in a communication system.

FIG. 15 illustrates a sequence figure that describes an example of an address book distribution process in a communication system. The programs of the image forming apparatuses 101, 102 that realize the address book distribution process described making reference to FIG. 15 are stored in the HDD 211 of the image forming apparatus 101, 102, and are read into the RAM 303 for execution by the CPU 301. The programs of the print server 123 that realize the address book distribution process are stored in the HDD 312, and are read into the RAM 303 for execution by the CPU 301. In the following description, the image forming apparatus 102 functions as a first client device, and the image forming apparatus 101 functions as a second client device.

In the communication system according to the second embodiment, the processing in S901 to S905 illustrated in FIG. 10 (not illustrated in FIG. 15) is executed in the same manner as the communication according to the first embodiment before the processing in S1401.

In S1401, the image forming apparatus 102 receives a user operation, and updates the address book. More specifically, the address book application unit 406 (FIG. 5) updates the contacts in the address book that are managed by the address book management unit 407. Then, the image forming apparatus 102 transmits an address book change notification to the print server 123 (S1402). The address book change notification is a transmission from the intranet to outside of the firewall, and therefore does not require transmission in WebSocket, and is transmitted in HTTP.

Next, the print server 123 changes the address book in the print server 123 in accordance with the received address book change notification (S1403). Then, the print server 123 uses a Push transmission from outside of the firewall through the control WebSocket to transmit the application startup notification as illustrated in FIG. 16C to the image forming apparatuses 101, 102 (S1404). In other words, the connection control unit 601 provided in the print server 123 transmits a startup notification to the image forming apparatus 101 in relation to the address book application unit 406 that performs the processing to ensure that the information in the address book, that has been notified as updated, is reflected in the image forming apparatus 101.

The print server 123 may transmit the application startup notification at any time from S1401 to S1403. However in order to reduce the connection time of the application WebSocket, a later transmitting timing is preferred. Therefore, in the example illustrated in FIG. 15, the print server 123 takes the connection timing for the application WebSocket as the address book change timing by transmitting the application startup notification when the address book is changed. The print server 123 may determine that the image forming apparatus that has transmitted the address book change notification is the image forming apparatus 102, and only transmit the application startup notification to the image forming apparatus 101.

The image forming apparatus 101, 102 uses the message as illustrated in FIG. 16A to the print server 123 to perform the application WebSocket connection (S1405). Then the print server 123 uses the message as illustrated in FIG. 16B to the image forming apparatuses 101, 102 to return the application WebSocket connection response (S1406). The print server 123 distributes the address book as illustrated in FIG. 16D using a Push transmission through the application WebSocket to the image forming apparatuses 101, 102 (S1407).

Next, the image forming apparatuses 101, 102 change the address book in accordance with the details of the received address book (S1408). The print server 123 transmits the application stop notification to the image forming apparatuses 101, 102 through the application WebSocket when all the address book data distributed in S1407 has been transmitted (S1409). Although the print server 123 may transmit the application stop notification after S1407, in order to reduce the connection time of the application WebSocket, an earlier transmitting timing is preferred. Therefore, in the example illustrated in FIG. 15, the print server 123 takes the application Websocket disconnection timing as the address book distribution completion timing by transmitting the application stop notification to the image forming apparatuses 101, 102 after the address book is distributed. The image forming apparatuses 101, 102 may be configured to transmit the application stop notification to the print server 123 through the application WebSocket.

Next, the image forming apparatuses 101, 102 transmits the application Websocket disconnection to the print server 123 (S1410). The print server 123 returns the application WebSocket disconnection response to the image forming apparatuses 101, 102 (S1411). The processing after S1411 is the same as the processing from S919 to S922 in FIG. 10. Then the print server 123 may execute the following processing at the time of connection of the image forming apparatus to the image forming apparatus that is not connected to the control WebSocket. The print server 123 determines whether the address book has been distributed into that image forming apparatus, and when distribution of the address book is complete, the application startup notification is transmitted to that image forming apparatus.

FIG. 16 illustrates an example of a message that is transmitted and received between the image forming apparatus and the print server in the second embodiment. FIG. 16A illustrates an example of a message that is transmitted during WebSocket connection. The Sec-WebSocket-Protocol header indicates the use that is made of WebSocket. In the present embodiment, "control" is described to indicate a control WebSocket and "address" is described to indicate an address book application WebSocket. The message is transmitted in S1405 of FIG. 15, and the print server 123 receiving the message returns a response message as illustrated in FIG. 16B.

FIG. 16B illustrates an example of a response message to the message in FIG. 16A. The Sec-WebSocket-Protocol header indicates what use is made of WebSocket. The message is transmitted in S1406 of FIG. 15, and establishes a WebSocket connection between the image forming apparatuses 101, 102 and the print server 123.

FIG. 16C illustrates an example of a message instructing connection of the application WebSocket through the control WebSocket. The <WebSocketControl> tag indicates use in WebSocket control. The <AppName> tag indicates the application name, and the application Websocket that is the subject of the instruction. In the present embodiment, "address" is described to indicate the address book application. The <Status> tag indicates whether the instruction is a connection instruction or a disconnection instruction. In the present embodiment, when the <Status> tag is open, a connection instruction is indicated, and when close, a disconnection instruction is indicated. The message is transmitted in S1404 in FIG. 15, and the image forming apparatuses 101, 102 receiving the message transmit the application WebSocket connection to the print server 123.

FIG. 16D illustrates an example of a message that transmits the address book through the application WebSocket. The <AddressBook> tag indicates address book distribution. The <email> tag indicates mail address information. The email address information is separately set in the <User> tag. The message is transmitted in S1407 of FIG. 15, and the image forming apparatus 101 that receives the message changes the address book.

The communication system in the second embodiment enables the following effects when establishing a network connection to thereby enable transmitting of an address book distribution signal, that takes the print server 123 for the starting point, through a firewall to a client device. That is to say, the communication system according to the second embodiment manages the connection and disconnection of the address book application WebSocket through the control WebSocket after connection of a single control WebSocket. Therefore, even when the number of applications in a printer increases, the load on the print server 123 related to the network connection management can be suppressed. Furthermore, the print in the communication system according to the second embodiment does not require a connection of an application WebSocket in relation to all applications during startup, and therefore unnecessary printer resources can be prevented.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-160992 filed Jul. 19, 2012, which is hereby incorporated by reference herein in its entirety.

What is claimed is:

1. An information processing system in which a client device and a server apparatus communicate through a firewall,
wherein the client device comprises:
an establishment unit configured to establish a first network connection using a network protocol to enable transmitting of a request that is issued by taking the server apparatus for the starting point through the firewall to the client device, the server apparatus disposed outside the firewall, wherein the server apparatus comprises:
a transmitting unit configured to transmit an instruction to establish a network connection corresponding to an application installed on the client device, and
wherein, after the first network connection is established by the establishment unit, the client device receives the instruction transmitted from the server apparatus through the first network connection, and the establishment unit establishes a second network connection in accordance with the received instruction,
wherein the establishment unit provided in the client device establishes the first network connection through the connection of a first network protocol, and establishes the second network connection through the connection of a second network protocol,
wherein the second network protocol is used in communication of information required for execution of processing corresponding to the request by taking the server apparatus for the starting point, between the server apparatus and the application, and
wherein the first network protocol controls a connection/disconnection timing of the second network protocol.

2. The information processing system according to claim 1, wherein the establishment unit provided in the client device establishes the first network connection using the first network protocol when the client device starts up, and
when a startup notification is received for the application, among a plurality of applications installed on the client device, that executes a processing corresponding to the request that is issued by taking the server apparatus for the starting point, the establishment unit establishes the second network connection using the second network protocol corresponding to the application associated with the startup notification.

3. The information processing system according to claim 1, wherein the server apparatus comprises a disconnection unit configured to disconnect the second network protocol when the execution of the processing corresponding to the request issued by taking the server apparatus for the starting point is completed.

4. The information processing system according to claim 1, wherein the server apparatus comprises an issuing unit configured to issue the request upon startup of the server apparatus, when a specific request or notification has been received from an external apparatus, and to transmit the issued request in relation to an application that executes the processing corresponding to the request through the established second network connection.

5. The information processing system according to claim 4, wherein when a print request has been received by the server apparatus from the external apparatus, the transmitting unit provided in the server apparatus executes a startup notification for the application that executes a print job, the notification being an instruction to establish the second network connection for the application through the first network protocol to the client device, and
wherein the establishment unit provided in the client device connects the second network protocol corresponding to the application that executes the print job and establishes the second network connection, when the startup notification for the application that executes the print job is received from the transmitting unit.

6. The information processing system according to claim 5, wherein the server apparatus further comprises a provision unit configured to provide screen data used in the instruction for the print request to the external apparatus, the screen data including display information for the client device connected by the first network protocol.

7. The information processing system according to claim 4, wherein the external apparatus is a plurality of client devices including the client device,
wherein when a change notification for an address book in a first client device has been received by the server apparatus from the first client device, the transmitting unit provided in the server apparatus executes a startup notification for the application that executes the processing of reflecting the information in the address book in a second client device, the notification being an instruction to establish the second network connection for the application through the first network protocol to the second client device, and
wherein, when the startup notification for the application that executes the processing of reflecting information in the address book is received from the transmitting unit, the establishment unit provided in the second client device connects the second network protocol corresponding to the application and establishes the second network connection.

8. The information processing system according to claim 6, wherein the transmitting unit provided in the server apparatus determines whether an address book that is subject to a change notification has been distributed to a client device upon connection of the client device to the first network protocol, such determination made in relation to a client device that is not connected to the first network protocol, and
when the address book that is subject to a change notification has not been distributed to the client device, a startup notification for the application that executes the processing of reflecting the information in the address book is performed in relation to the client device.

9. The information processing system according to claim 1, wherein the network protocol is WebSocket.

10. A client device that communicates through a firewall with a server apparatus disposed outside the firewall, the client device comprising:
an establishment unit configured to establish a first network connection using a network protocol that enables transmitting of a request that is issued by taking the server apparatus for the starting point through the firewall to the client device; and
a receiving unit configured to receive an instruction from the server apparatus, the instruction configured to establish a second network connection corresponding to an application installed on the client device and being transmitted from the server apparatus through the first network connection after establishment of the first network connection by the establishment unit, wherein the establishment unit establishes a second network connection in accordance with the received instruction,
wherein the establishment unit establishes the first network connection through the connection of a first network protocol, and establishes the second network connection through the connection of a second network protocol,
wherein the second network protocol is used in communication of information required for execution of processing corresponding to the request by taking the server apparatus for the starting point, between the server apparatus and the application, and
wherein the first network protocol controls a connection/disconnection timing of the second network protocol.

11. A method for controlling an information processing system in which communication is performed through a firewall between a client device and a server apparatus, the method comprising:
- establishing, by the client device, a first network connection using a network protocol to enable transmitting of a request that is issued by taking the server apparatus for the starting point, that is disposed outside the firewall, through the firewall to the client device;
- transmitting, by the server apparatus, an instruction to establish a second network connection corresponding to an application installed on the client device through the first network connection, after the first network connection is established; and
- receiving, by the client device, the instruction transmitted from the server apparatus, and establishing the second network connection in response to the received instruction,
- wherein the first network connection is established through the connection of a first network protocol, and the second network connection is established through the connection of a second network protocol,
- wherein the second network protocol is used in communication of information required for execution of processing corresponding to the request by taking the server apparatus for the starting point, between the server apparatus and the application, and
- wherein the first network protocol controls a connection/disconnection timing of the second network protocol.

* * * * *